(12) United States Patent
Moerke et al.

(10) Patent No.: US 7,832,693 B2
(45) Date of Patent: Nov. 16, 2010

(54) FASTENER

(75) Inventors: Benjamin H. Moerke, Chippewa Falls, WI (US); James T. Kirchen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 909 days.

(21) Appl. No.: 11/540,078

(22) Filed: Sep. 29, 2006

(65) Prior Publication Data

US 2007/0126211 A1  Jun. 7, 2007

Related U.S. Application Data

(60) Provisional application No. 60/748,057, filed on Dec. 7, 2005.

(51) Int. Cl.
*F16B 15/00* (2006.01)

(52) U.S. Cl. .................. 248/71; 280/728.2; 280/730.2; 24/16 PB; 24/573.09; 411/507

(58) Field of Classification Search ................ 248/74.1, 248/74.2, 73, 68.1, 71, 74.3, 216.1, 216.4; 24/16 PB, 573.09, 581.11; 411/507, 45, 411/46, 47, 48, 41; 280/728.2, 730.2
See application file for complete search history.

(56) References Cited

U.S. PATENT DOCUMENTS

| | | | | | |
|---|---|---|---|---|---|
| 2,941,768 | A | * | 6/1960 | Elms et al. ................ | 248/71 |
| 3,157,377 | A | * | 11/1964 | Orenick .................... | 248/71 |
| 3,595,506 | A | * | 7/1971 | Saunders .................. | 248/71 |
| 3,819,139 | A | * | 6/1974 | Jemison .................... | 248/73 |
| 5,163,795 | A | | 11/1992 | Benoit et al. | |
| 5,507,610 | A | | 4/1996 | Benedetti et al. | |
| 5,538,210 | A | * | 7/1996 | Ohmori ..................... | 248/71 |
| 6,053,458 | A | | 4/2000 | Meyer | |
| 6,206,606 | B1 | * | 3/2001 | Mita et al. ................. | 403/320 |
| 6,209,907 | B1 | | 4/2001 | Fischer | |
| 6,333,515 | B1 | | 12/2001 | Kubota et al. | |
| 6,394,695 | B1 | | 5/2002 | Chausset | |
| 6,431,585 | B1 | | 8/2002 | Rickabus et al. | |
| 6,443,403 | B1 | * | 9/2002 | Page et al. ................. | 248/71 |
| 6,565,117 | B2 | | 5/2003 | Kubota et al. | |

(Continued)

FOREIGN PATENT DOCUMENTS

DE    29909326    10/1999

(Continued)

*Primary Examiner*—Kimberly T Wood
(74) *Attorney, Agent, or Firm*—Mark W. Croll; Paul F. Donovan

(57) ABSTRACT

The invention relates to fasteners adapted for use in automobile air bag attachment systems. The fastener comprises a hook to engage a vehicle structure during installation and a pin to lock the fastener in place. Advantageously, the hook portion may be quickly installed and will support the air bag assembly while allowing any positional adjustments to be made prior to locking the fastener by depressing the pin until it is fully engaged in the vehicle structure. An embodiment of the invention incorporates both a locking method to prevent the fastener from being disengaged and a method of releasing this lock if needed for servicing. Another aspect of the invention provides a method for reducing the likelihood of improperly installed parts by preventing locking when the fastener is in a partially installed configuration.

8 Claims, 9 Drawing Sheets

U.S. PATENT DOCUMENTS

| | | |
|---|---|---|
| 6,752,576 B2 | 6/2004 | Johansson et al. |
| 7,077,449 B2 | 7/2006 | Tokunaga |
| 2003/0178832 A1 | 9/2003 | Dominissini et al. |
| 2004/0089770 A1* | 5/2004 | Akizuki ........................ 248/71 |
| 2005/0062263 A1 | 3/2005 | Kawai et al. |
| 2005/0285374 A1 | 12/2005 | Kawai et al. |
| 2005/0285375 A1 | 12/2005 | Kawai et al. |

FOREIGN PATENT DOCUMENTS

| | | |
|---|---|---|
| DE | 10006060 | 8/2001 |
| GB | 2367536 | 4/2002 |
| JP | 9-315253 | 12/1997 |
| JP | P3422299 | 4/2003 |
| WO | WO 0140667 | 6/2001 |
| WO | WO 2005005208 | 1/2005 |

* cited by examiner

FASTENER

CROSS REFERENCE TO RELATED APPLICATIONS

This Non-Provisional Application claims benefit to U.S. Provisional Application Ser. No. 60/748,057 filed Dec. 7, 2005.

FIELD OF THE INVENTION

The field of the invention generally relates to fasteners, and more particularly, to fasteners adapted for use in automobile air bag attachment systems.

BACKGROUND OF THE INVENTION

It is known that air bags are used in vehicles to provide passenger safety in the event of an accident. It is further known that air bag attachment systems are used to secure the air bag to the vehicle structure. Typically, the known air bag attachment systems include fasteners that utilize metal inserts to provide the requisite high retention of the air bag to the vehicle structure. Some of the known designs incorporate a metal insert and utilize screws to attach the fastener to the vehicle structure. Drawbacks and disadvantages with such fasteners exist. For example, the employment of metal inserts and screws increase the tendency of the fastener components to buzz, squeak, and rattle while the vehicle is in use. Also, the design of the metal inserts may not be conducive to a visual inspection of the air bag fastener to ensure the complete and correct installation of the fastener.

The present invention addresses these and other drawbacks with known fasteners used with vehicle air bag systems by providing a unique plastic fastener assembly for use with the air bags that provides easy installation, advantageous locking features, and a large area of communication between the vehicle structure and the fastener.

SUMMARY OF THE INVENTION

In one aspect of the invention, a fastener for attaching air bags to a vehicle structure provides a secure attachment of the air bags to a vehicle structure and a releasable strap that allows the air bags to properly deploy. The invention results in a serviceable attachment that is easy to install, provides high retention features, and is resistant to the generation of rattles and other noises. In addition, the fastener of the invention reduces the likelihood of partially installed fasteners and improves the visual inspection of the fastener to ensure proper installation.

In another aspect, the method of attaching the air bag to the vehicle of the present invention eliminates the need for metal inserts by providing a large interference between the vehicle structure and a rigid portion of the plastic fastener. The invention also incorporates a technique of locking the fastener in this position to prevent it from being disengaged, and a technique for releasing this lock if needed for servicing. The attaching method of the invention simplifies assembly of the air bag system by using a hook portion that may be quickly installed to the vehicle and will support the system while allowing any positional adjustments to be made prior to locking the fastener to the vehicle.

Other features and advantages of the invention will become apparent to those skilled in the art upon review of the following detailed description, claims and drawings in which like numerals are used to designate like features.

DETAILED DESCRIPTION OF THE EMBODIMENTS

Figure 1:
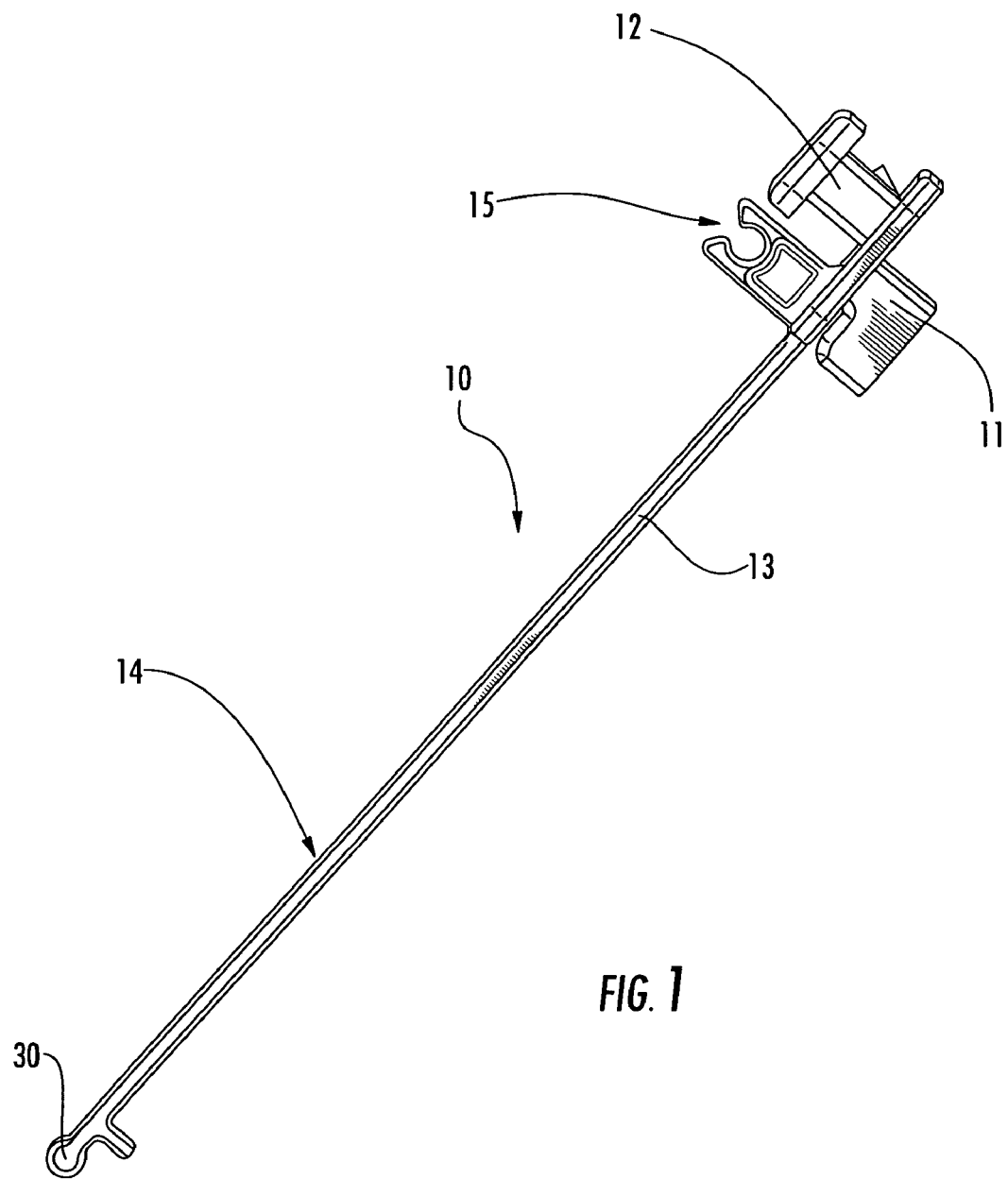
FIG. 1 illustrates a side view of an exemplary embodiment of a fastener of the present invention.
Figure 2:
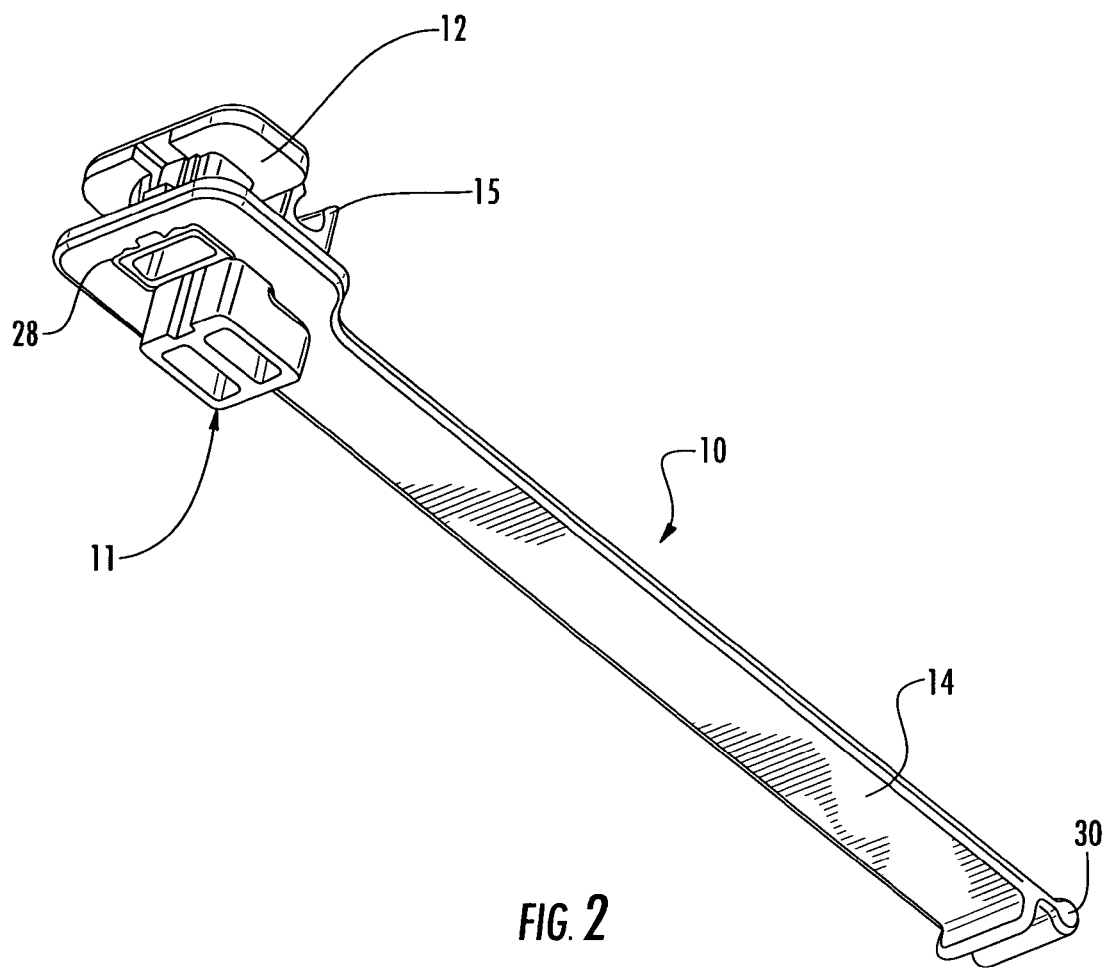
FIG. 2 illustrates a perspective view of the fastener assembly of an embodiment of FIG. 1.
Figure 3:
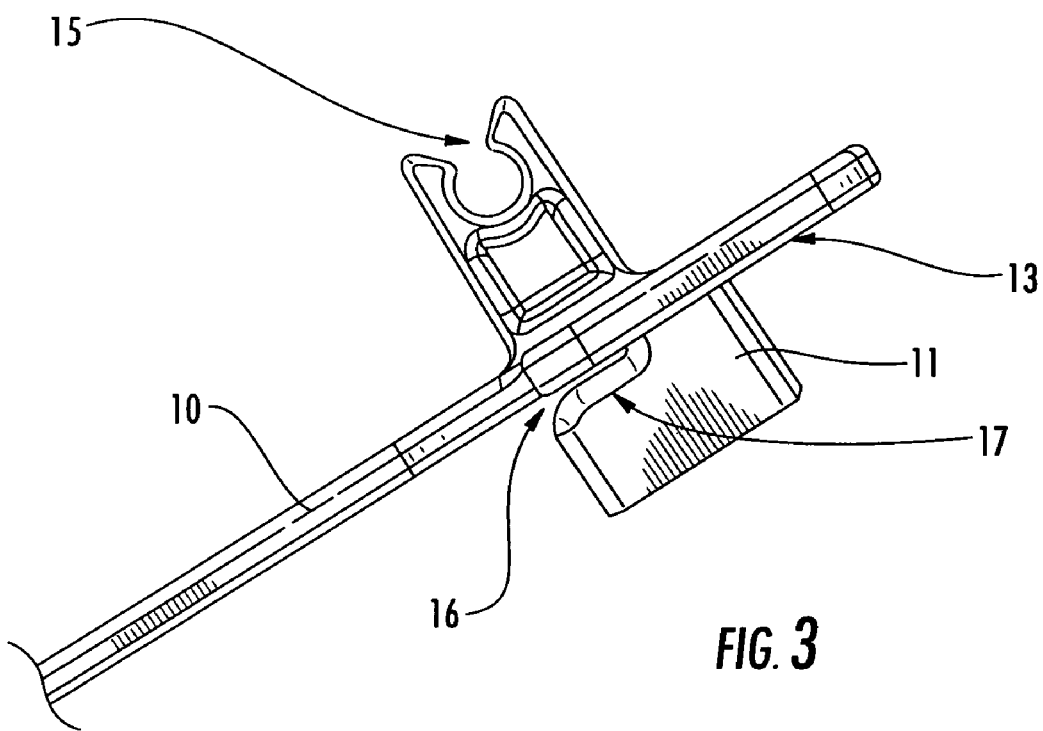
FIG. 3 illustrates a side view of features of the fastener assembly of an embodiment of the present invention.
Figure 4:
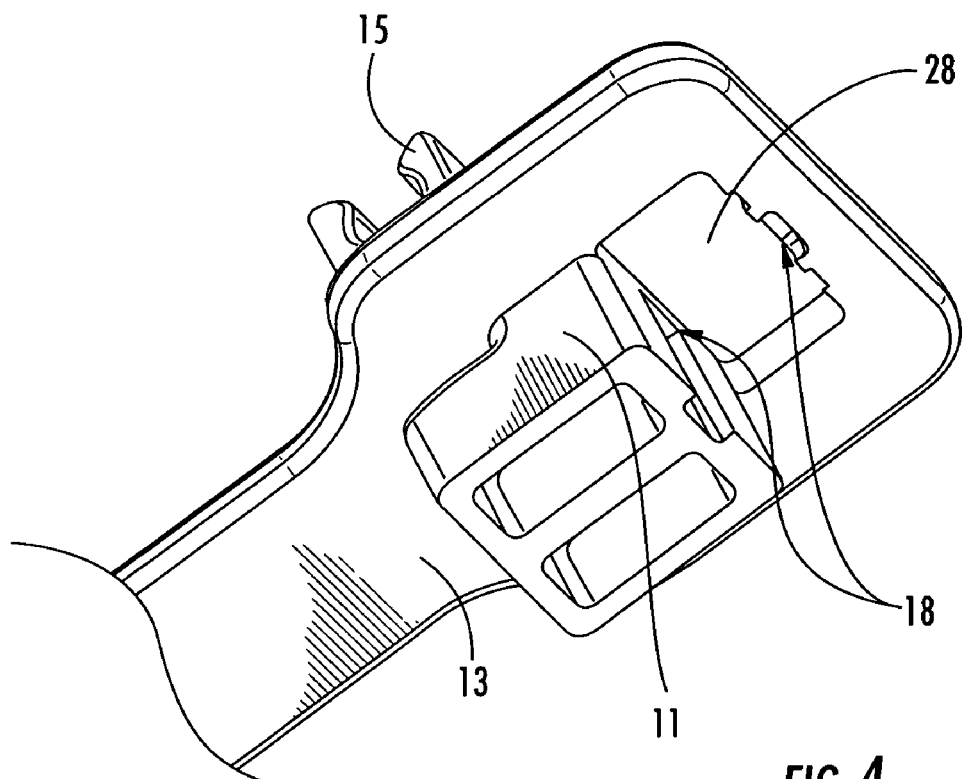
FIG. 4 illustrates a perspective view of the hook and pin catch features of the fastener assembly of an exemplary embodiment of the present invention.

The present invention may be embodied in many forms. Referring to the Figures, there are depicted various aspects of the invention. An embodiment of the present invention includes a fastener 10 adapted for use in automobile air bag attachment systems, for example. Referring to FIGS. 1 and 2, the fastener 10 comprises a base 13 having a planar surface and a hook 11 and pin 12 to secure the base 13 to a vehicle. The hook 11 may be mounted to the base 13 such that the hook is disposed on the underside, or bottom surface, of the base 13. The pin 12 may be disposed adjacent to the hook 11 and configured to slide through an aperture 28 (FIG. 4) in the base 13 defined by inner walls configured to accommodate the outer dimensions of the pin 12. The assembly and installation of the fastener 10 and its components to the vehicle is described below. It is noted that the fastener 10 may be made as an integral component or assembled from the individual elements described herein. For example, in an embodiment, the pin 12 may be made as an integral component with the hook 11 and the base 13 to provide a one-piece component.

The fastener 10 may include a strap 14 made of a woven material, or any other acceptable flexible material. The remaining elements of the fastener may be made of a resilient plastic or other suitable material having substantial structural integrity. The fastener 10 further defines a mating end 30 that aids in securing the air bag to the vehicle.

Figure 9:
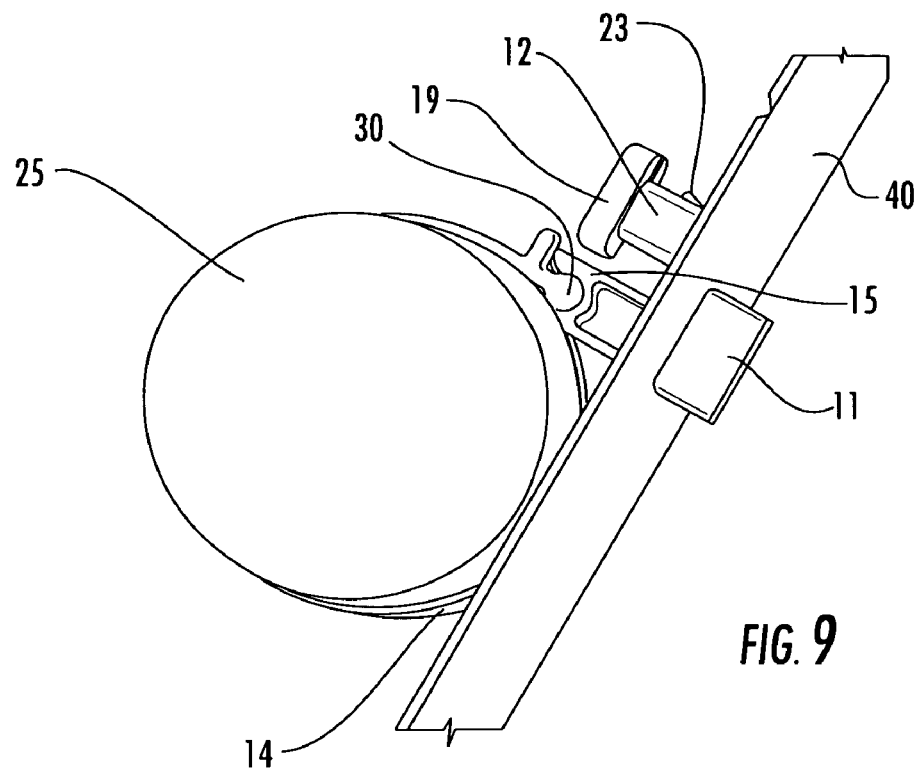
FIG. 9 illustrates a perspective view of an air bag assembly, the hook of an exemplary fastener inserted into an automobile structure.

As exemplified by FIG. 9, the fastener 10 may be attached to an air bag 25 by wrapping the air bag within the strap 14 and snap-fitting the end 30 to a strap retainer 15 disposed on the top surface of fastener base 13. In one embodiment, the strap retainer 15 is configured to form flexible fingers that form an opening to receive and retain the mating end 30 of the strap 14. The strap retainer 15 may be made of a material that is sufficiently flexible to be displaced outwardly from the force applied to insert the mating end 30 during installation and to expel the mating end during air bag deployment, yet rigid enough to retain the mating end 30 during standard operation of the vehicle. In alternative embodiments, the strap retainer 15 and the mating end 30 of the strap may define various shapes and other configurations to tailor the releasing force required to release the end 30 from the retainer 15 to the particular application requirements. For example, the strap retainer 15 may comprise a shape that extends out substantially beyond the surface of the base 13. In one aspect of the invention, two straps 14 may be attached to the fastener 10, each strap wrapping around opposite sides of an air bag and connecting, for example, in the middle, with one strap ending in a strap retainer 15 and the other in a mating end 30.

Figure 13:
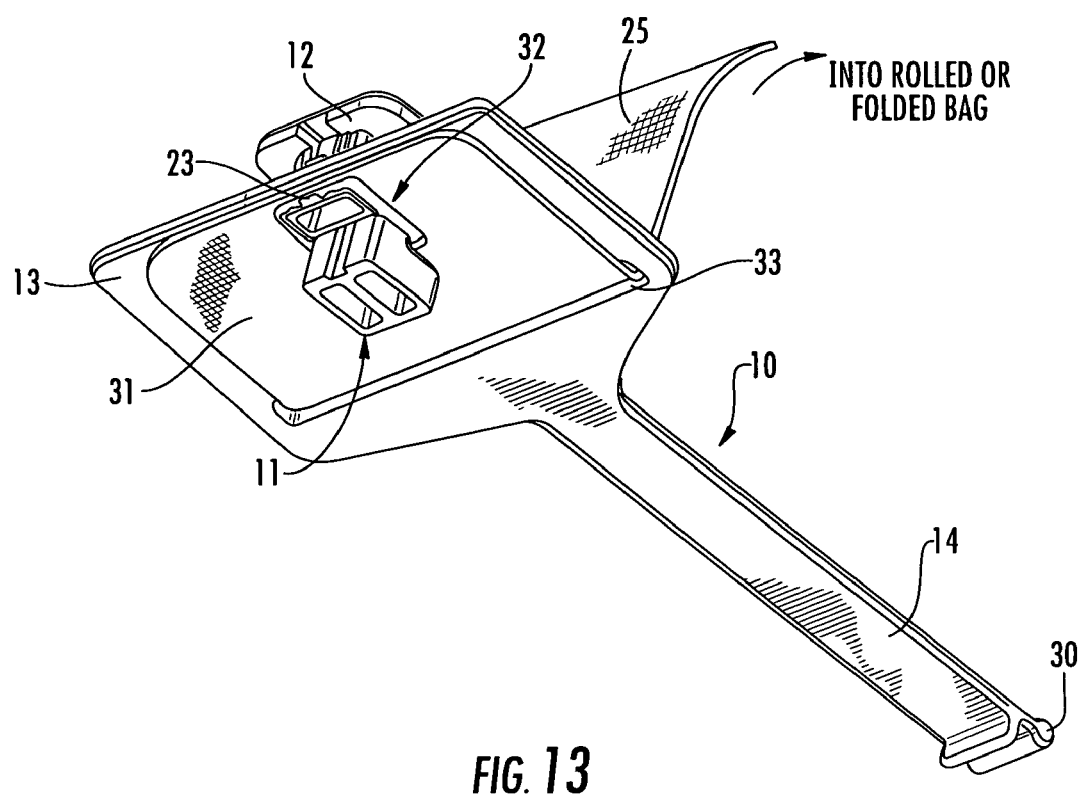
FIG. 13 illustrates a perspective view of a fastener with a wide base and shows the attachment of an air bag tab according to an embodiment of the invention.

In an exemplary embodiment, the air bag 25 may also be attached to the fastener 10 in the manner depicted in FIG. 13. As shown in FIG. 13, when an air bag is rolled up or folded and ready for installation, it may include one or more tabs 31 each defining a hole 32 to provide attachment to the fastener 10. In this embodiment, the tab 31 may slide through a slot 33 in the base 13 and then be placed over the hook 11. Once the assembly is installed to the vehicle, the airbag tab 31 may be held between the main hook 11 and the vehicle structure, thereby providing a secure attachment.

Figure 14:
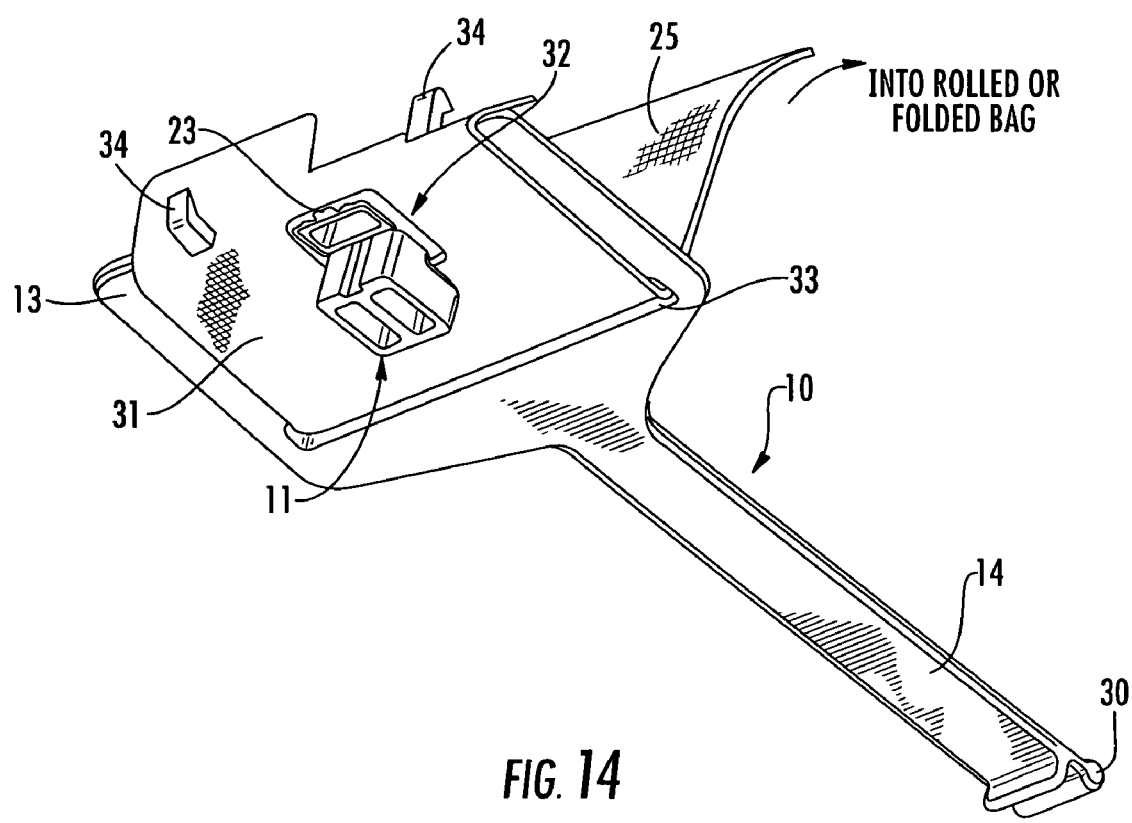
FIG. 14 illustrates a perspective view of a fastener with a wide base and shows the attachment of an air bag tab according to an alternative embodiment of the invention.

In an alternative aspect, the air bag 25 may be attached to the fastener 10 in the manner depicted in FIG. 14, which is similar to the attachment shown in FIG. 13, with the additional use of one or more pegs 34 on the base 13 that will engage the tab 31. The pegs 34 may hook and hold the tab 31 of the air bag 25 to the fastener 10 to further secure the tab 31 to the fastener. Similar to the embodiment of FIG. 13, the tab 31 may slide through the slot 33 in the base 13 and then may be placed over the hook 11. Once the assembly is installed to the vehicle, the tab 31 may be held between the hook 11 and the vehicle structure and by the pegs 34.

As described above, there may be two attachments between the airbag 25 and the fastener 10. One may be the air bag tab attachment described above and shown in FIGS. 13 and 14, and the second may be the strap 14 and strap retainer 15 holding the airbag in place until the airbag deploys. Once attached to the air bag, the fastener 10 of the invention may then be shipped as part of the air bag assembly. Typically, an air bag assembly will contain several fasteners 10 to attach at different locations within the vehicle.

Referring to FIGS. 3 and 7-11, to install the air bag fastener assembly of an embodiment of the invention to a vehicle, the hook 11 is inserted into an existing mounting area, or hole 42, in the vehicle structure 40. This is achieved by an engagement area 16 (FIG. 3) that is formed between the surface 17 of the hook 11 and the bottom surface of the fastener base 13. The engagement area 16 is the opening to receive the wall of the vehicle structure 40. In other words, as installed, the wall of the vehicle structure 40 will be positioned between the surface 17 and the bottom surface of the fastener base 13. The surface 17 may further include a lead-in ramp disposed at the end of the surface 17 to facilitate the insertion of the wall of the vehicle structure between the surface 17 and the bottom surface of the fastener base 13 by providing a larger area into which to initially engage the vehicle structure wall edge.

After the hook 11 is installed on the vehicle structure, the pin 12 may then be inserted through the aperture 28 in the base 13. This is accomplished by depressing the pin 12 from a disengaged position (FIGS. 9 and 10) above the base to an engaged position (FIGS. 11 and 12) wherein the underside of pin head 19 is in substantial communication with the top surface of the base 13. The pin head 19, illustrated in FIG. 5, is defined by a planar element disposed on top of and normal to the pin shank 20, having a lip portion extending outwardly from all sides beyond the outer diameter of the pin shank to prevent the pin 12 from sliding completely through the base 13.

Figure 5:
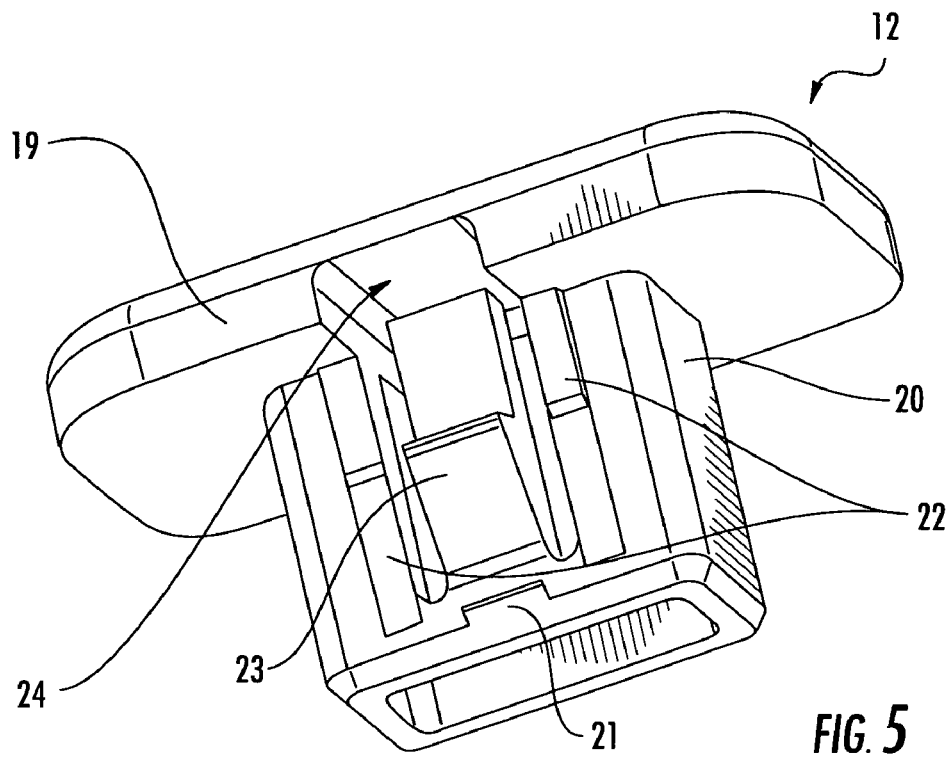
FIG. 5 illustrates a perspective view of the pin of an embodiment of the present invention.
Figure 6:
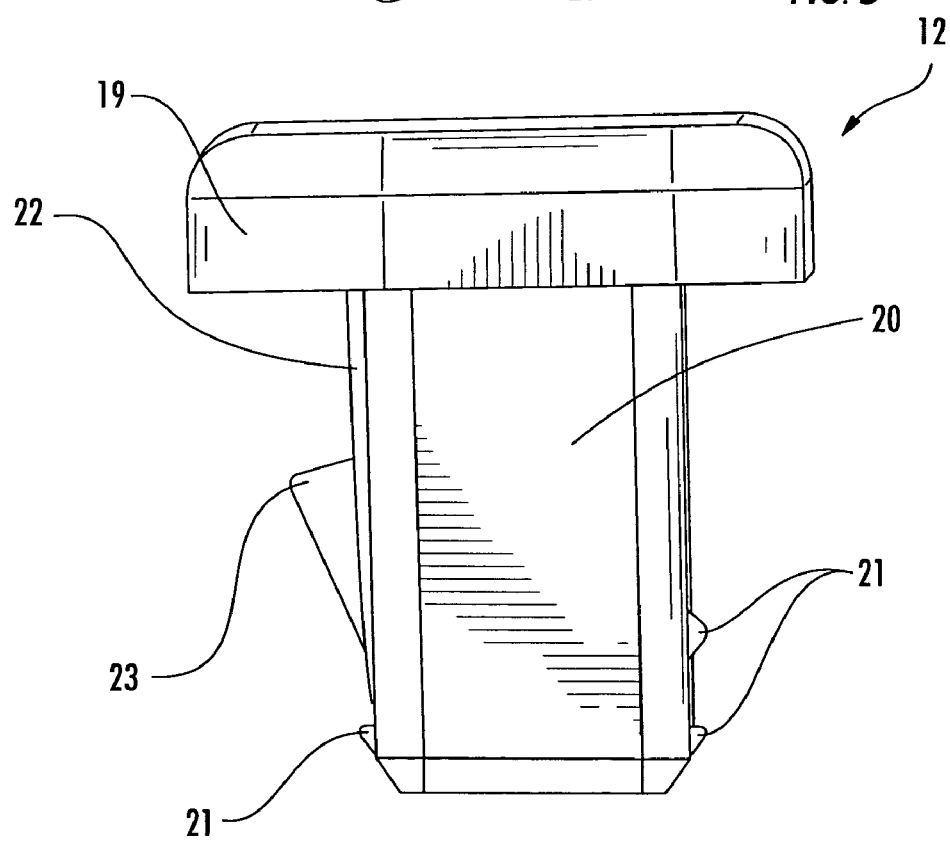
FIG. 6 illustrates a side view of the pin of FIG. 5.
Figure 7:
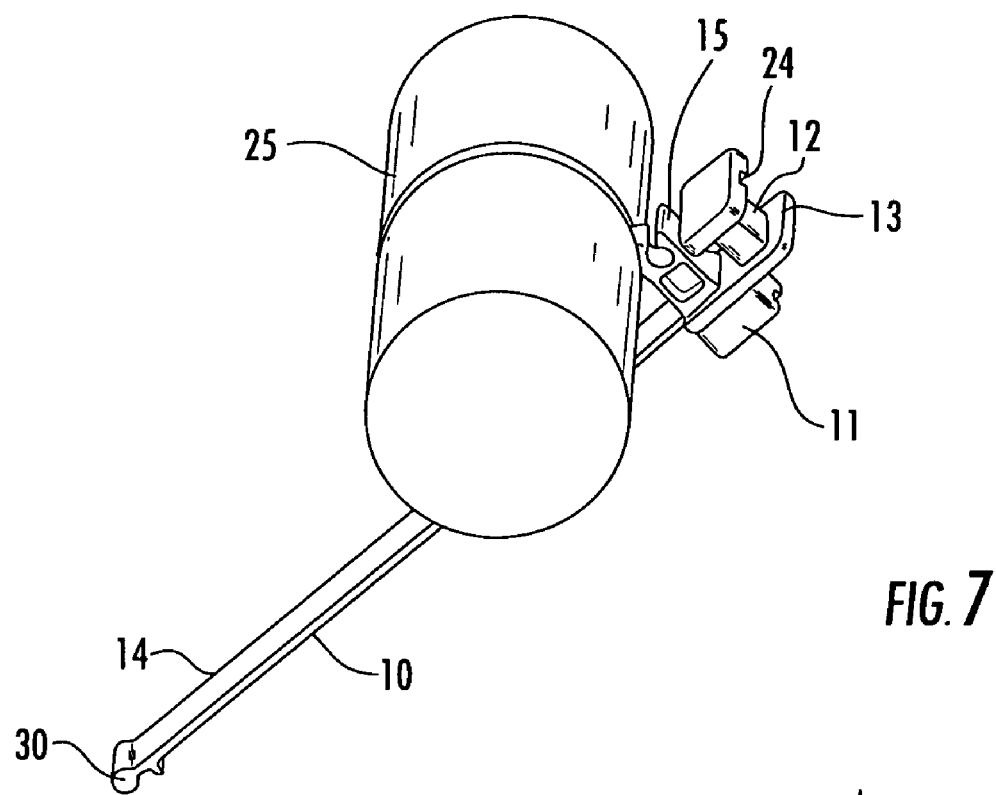
FIG. 7 illustrates a perspective view of an air bag assembly, including an embodiment of the present invention.
Figure 8:
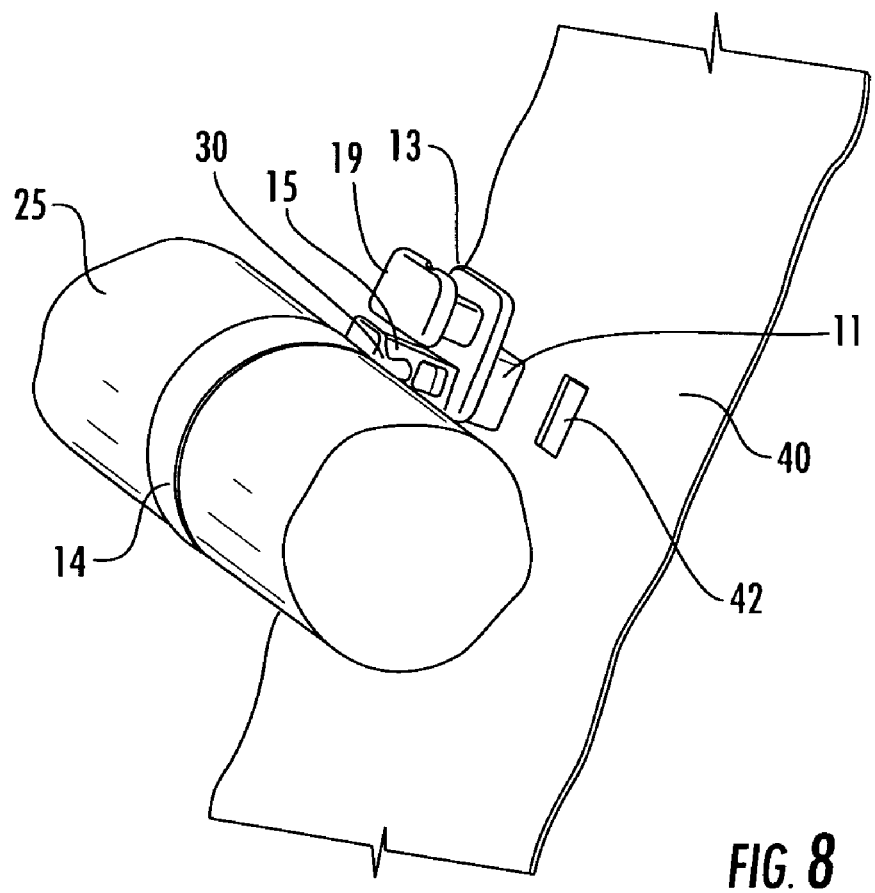
FIG. 8 illustrates a perspective view of an air bag assembly, including an embodiment of the present invention, prior to attachment to an automobile.
Figure 10:
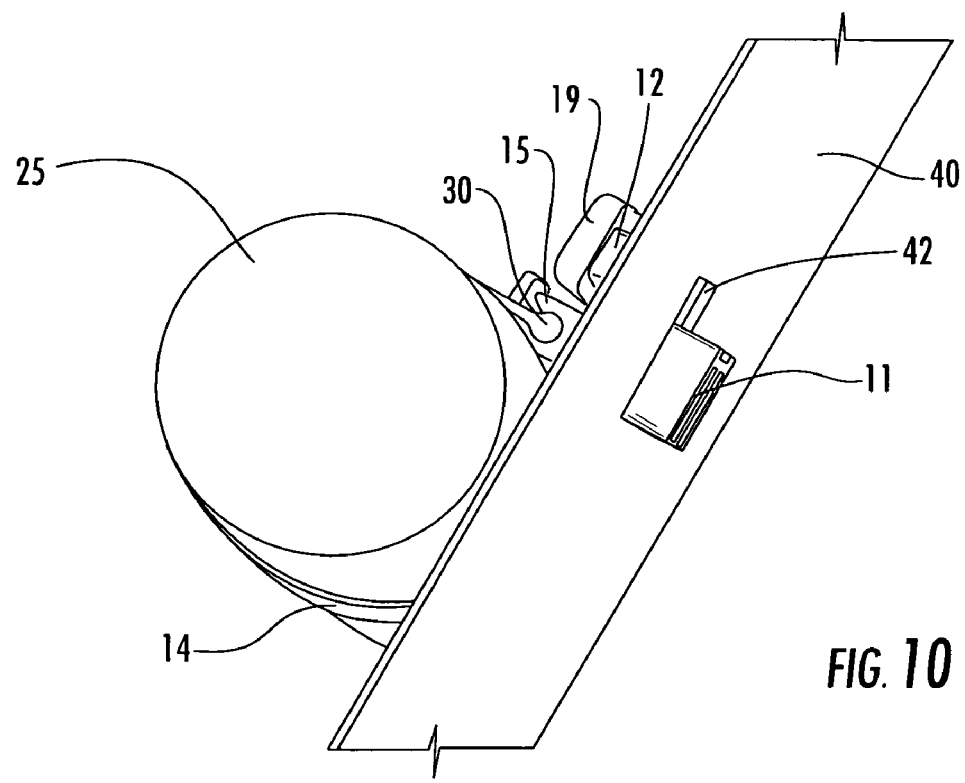
FIG. 10 illustrates a perspective view of an air bag assembly, the hook of an exemplary fastener inserted into an automobile structure and slid into the engaged position.
Figure 11:
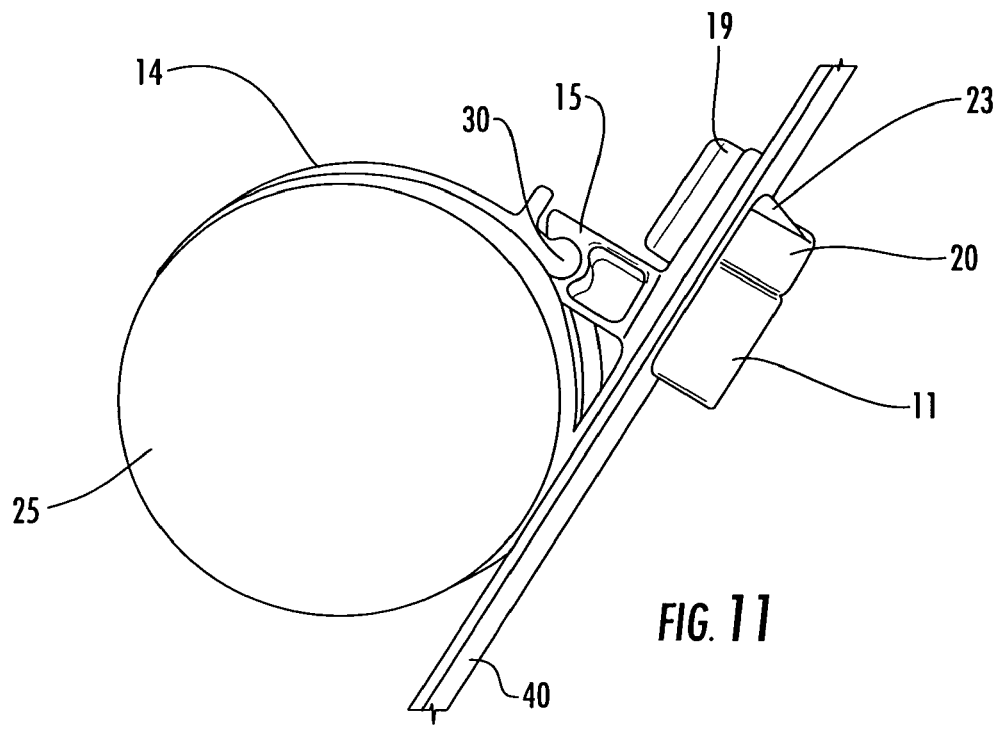
FIG. 11 illustrates a perspective view of a fully installed air bag assembly according to an embodiment of the present invention.

Referring to FIGS. 5 and 6, in aspects of the invention, the pin 12 may further define pre-install tabs 21, tightening ramps 22, a locking tab 23, a service notch 24, or a combination thereof. The pre-install tabs 21 may be disposed at the lower end of opposing sides of the pin shank 20. When the pin 12 is in the disengaged position the tabs 21 are configured to be retained in pin catches 18 (FIG. 4) formed in the base 13 and defined by the hook 11. The pin catches 18 are configured to retain the tabs 21 and thus the pin 12 in a disengaged position to prevent obstruction by the pin 12 during certain installation steps. As the pin 12 is depressed or moved to an engaged position and enters the hole 42 in the vehicle structure 40 (as illustrated by FIGS. 10 and 11), tightening ramps 22 (FIG. 5), disposed primarily vertically along one face of the pin shank 20 and generally normal to the pin head 19, may provide a slight interference with the hole 42 in the vehicle structure 40 to ensure a snug and rattle-free engagement. The tightening ramps 22 may be wedge shaped, for example, on the pin shank 20, such that the width of the top of the shank is somewhat greater than the width of the bottom of the shank. The tightening ramps 22 may be flexible or elastic in an embodiment, or in an alternative embodiment, may be of a non-flexible construction.

As the pin 12 becomes fully seated, in an aspect of the invention, a locking tab 23, parallel to and disposed between tightening ramps 22, engages the hole 42 in the vehicle structure 40 to secure the fastener assembly to the vehicle (as illustrated by FIG. 11). The locking tab 23 may be a flexible tab that moves inward upon assembly and then snap-back during final installation, or the tab can be slightly resilient or otherwise configured to allow insertion of the pin and yet grab or engage the underside of the vehicle structure 40 upon final installation. In an alternate aspect, the pin 12 catches in the base 13 via the pin catches 18 to secure the fastener assembly to the vehicle.

Figure 12:
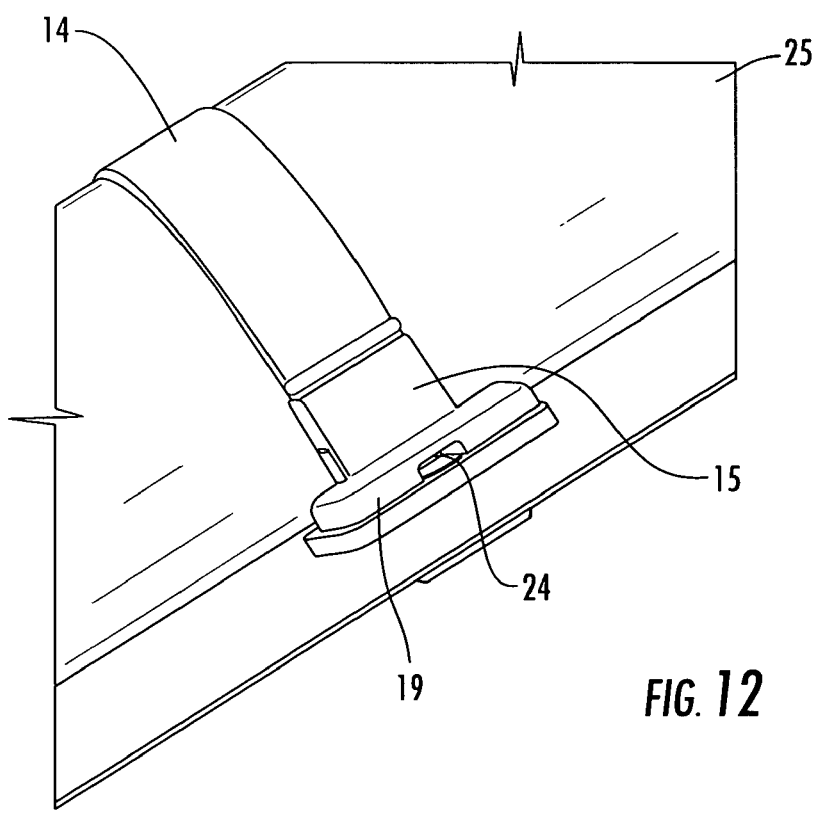
FIG. 12 illustrates a perspective view of a service notch of an exemplary fastener on a fully installed air bag assembly according to an embodiment of the present invention.

Should replacement of any part of the assembly be necessary, an embodiment of the invention includes the use of a service notch 24 (FIGS. 5 and 12). The notch 24 may be formed in the pin head and may define an opening above the locking tab 23 to allow a tool, such as a small screwdriver or other similar tool, to be inserted therein to release the locking tab 23 and pry up the pin head 19. In another aspect, the notch 24 is located in the base 13, defining an opening such that a small tool may be inserted to release the pin locking tab 23 that is adjacent to the base when the pin is in a fully engaged position. When the pin 12 is returned to the disengaged position, the hook 11 can then be removed. For some applications, serviceability may not be required and the service notch could be eliminated.

It is important to note that if the hook 11 is only partially installed in the hole in the vehicle structure (FIG. 9), the result will be interference between the pin shank 20 and the vehicle structure, preventing the pin 12 from being driven through the hole. Therefore, a simple visual check to insure that the pin 12 is fully seated (FIG. 11) provides confidence that the part is properly installed. This verification feature is an exemplary advantage of the present invention.

When the air bag 25 deploys, the strap retainer 15 releases the end 30 at a predetermined force and the end 30 of the strap 14 is forced out of the way. The mounting configuration between the fastener assembly and the vehicle structure, described above, results in a secure attachment of the fastener to the vehicle that prevents the fastener from breaking free from the vehicle structure during air bag deployment. In an alternate embodiment, an air bag may be affixed to the fastener without the use of a strap. While the invention has been described in connection with an air bag system, it should be understood that the exemplary fastener 10 may be used to secure or capture any number of different structures and may be used in numerous other applications.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener for use with an air bag system comprising:
   a base comprising a planar surface and defining an aperture;
   a hook disposed on the underside of the base planar surface and through the aperture;
   a hook engagement area further comprising an opening defined by the bottom surface of the base and part of a top surface of the hook to engage a structure wall of a vehicle;
   a pin defining a pin head and a pin shank, the pin disposed in the base aperture and configured to allow the pin shank to slide through the aperture the pin head configured to extend outwardly from the shank to prevent the pin from sliding completely through the base;
   a strap comprising a flexible material and defining a mating end; and
   a strap retainer defining an opening formed to retain the mating end of the strap, the strap retainer disposed on the top surface of the base adjacent to the aperture, the strap retainer further configured to release the mating end of the strap when release is desired;
   wherein the pin further comprises a locking tab disposed on a face of the pin shank to move flexibly inward upon depression of the pin through the aperture and then back to engage the structure wall of the vehicle when the pin is in a fully depressed position, and wherein the pin head comprises a service notch comprising an aperture to allow a tool to be inserted to release the locking tab, pry up the pin head, and remove the hook for servicing of the fastener.

2. The fastener of claim 1, further comprising a second strap comprising a flexible material and including the strap retainer.

3. The fastener of claim 1, wherein the pin further comprises pre-install tabs disposed at opposite sides of the shank and the base further comprises at least one pin catch disposed in the inner wall of the base aperture to retain the pre-install tabs when the pin is in a disengaged position.

4. A fastener for use with an air bag system comprising:
   a base comprising a planar surface and defining an aperture;
   a hook disposed on the underside of the base planar surface and through the aperture;
   a hook engagement area further comprising an opening defined by the bottom surface of the base and part of a top surface of the hook to engage a structure wall of a vehicle;
   a pin defining a pin head and a pin shank, the pin disposed in the base aperture and configured to allow the pin shank to slide through the aperture the pin head configured to extend outwardly from the shank to prevent the pin from sliding completely through the base;
   a strap comprising a flexible material and defining a mating end; and
   a strap retainer defining an opening formed to retain the mating end of the strap, the strap retainer disposed on the top surface of the base adjacent to the aperture, the strap retainer further configured to release the mating end of the strap when release is desired;
   wherein the pin further comprises pre-install tabs disposed at the lower end of opposite sides of the shank, and wherein the base further comprises at least one pin catch disposed in the wall of the base aperture, the pin catch configured to retain the pre-install tabs when the pin is in a disengaged position.

5. The fastener of claim 4, further comprising a locking tab disposed on a face of the pin shank to move flexibly inward upon depression of the pin through the aperture and to engage a bottom surface of the base when the pin is in a depressed position, wherein the base further comprises a service notch aperture to allow a tool to be inserted to release the pin locking tab, pry up the pin head, and remove the hook for servicing of the fastener.

6. A fastener for use with an air bag system comprising:
   a base comprising a planar surface and defining an aperture;
   a hook disposed on the underside of the base planar surface and through the aperture;
   a hook engagement area further comprising an opening defined by the bottom surface of the base and part of a top surface of the hook to engage a structure wall of a vehicle;
   a pin defining a pin head and a pin shank, the pin disposed in the base aperture and configured to allow the pin shank to slide through the aperture the pin head configured to extend outwardly from the shank to prevent the pin from sliding completely through the base;
   a strap comprising a flexible material and defining a mating end; and
   a strap retainer defining an opening formed to retain the mating end of the strap, the strap retainer disposed on the top surface of the base adjacent to the aperture, the strap retainer further configured to release the mating end of the strap when release is desired;
   wherein the pin further comprises tightening ramps disposed primarily vertically along one face of the pin shank and generally normal to the pin head to provide a slight interference with a mounting hole in the vehicle structure to ensure a snug and rattle-free engagement.

7. The fastener of claim 6, wherein the tightening ramps comprise wedge shapes on a face of the pin shank such that the width of the top of the shank is greater than the width of the bottom of the shank.

8. The fastener of claim 6, wherein the tightening ramps comprise a flexible material.

* * * * *